United States Patent
Sazonov et al.

(10) Patent No.: US 11,258,771 B2
(45) Date of Patent: Feb. 22, 2022

(54) SYSTEMS AND METHODS FOR SENDING USER DATA FROM A TRUSTED PARTY TO A THIRD PARTY USING A DISTRIBUTED REGISTRY

(71) Applicant: AO Kaspersky Lab, Moscow (RU)

(72) Inventors: Alexander V. Sazonov, Moscow (RU); Roman V. Aleshkin, Moscow (RU); Alexander S. Korunov, Moscow (RU); Maxim V. Riveiro, Moscow (RU)

(73) Assignee: AO Kaspersky Lab, Moscow (RU)

( * ) Notice: Subject to any disclaimer, the term of this patent is extended or adjusted under 35 U.S.C. 154(b) by 272 days.

(21) Appl. No.: 16/791,156

(22) Filed: Feb. 14, 2020

(65) Prior Publication Data
US 2021/0021577 A1 Jan. 21, 2021

(30) Foreign Application Priority Data
Jul. 17, 2019 (RU) .......................... RU2019122429

(51) Int. Cl.
*H04L 9/32* (2006.01)
*H04L 29/06* (2006.01)
*H04L 9/06* (2006.01)

(52) U.S. Cl.
CPC ........ *H04L 63/0428* (2013.01); *H04L 9/0643* (2013.01); *H04L 9/321* (2013.01); *H04L 9/3247* (2013.01)

(58) Field of Classification Search
CPC .. H04L 63/0428; H04L 9/0643; H04L 9/3247
USPC ........................................................ 713/170
See application file for complete search history.

(56) References Cited

U.S. PATENT DOCUMENTS

| 7,003,480 | B2* | 2/2006 | Fox ..................... G06Q 20/3821 705/26.43 |
| 8,935,808 | B2* | 1/2015 | Barbir ................. H04L 63/0815 726/28 |
| 10,621,164 | B1* | 4/2020 | Kain ...................... G16H 10/60 |
| 11,100,197 | B1* | 8/2021 | Bernardi .................. H04L 9/14 |
| 2016/0283941 | A1* | 9/2016 | Andrade ............ G06Q 20/4014 |
| 2017/0140374 | A1* | 5/2017 | O'Brien .................. H04L 9/006 |
| 2019/0228132 | A1* | 7/2019 | Gabriel ................. H04L 9/0643 |
| 2021/0021577 | A1* | 1/2021 | Sazonov ............... H04L 9/3247 |
| 2021/0273806 | A1* | 9/2021 | Wilson .................. H04L 9/3247 |

* cited by examiner

*Primary Examiner* — Dant B Shaifer Harriman
(74) *Attorney, Agent, or Firm* — Arent Fox LLP; Michael Fainberg

(57) ABSTRACT

Disclosed herein are systems and method for securely sending user data. In an exemplary aspect, a trusted party device may receive a request for user data and a first hash of the request stored in a distributed registry. In response to verifying that the first hash matches a hash of the request as calculated by the trusted party device, the trusted party device may generate and transmit both a confirmation request to send the user data and a second hash of the confirmation request to an authorized user device. The trusted party device may receive, from the authorized user device, both a confirmation message and a third hash of the confirmation message stored in the distributed registry. In response to verifying that the third hash matches a hash of the confirmation message as calculated by the trusted party device, the trusted party device may send the requested user data.

20 Claims, 7 Drawing Sheets

500

```
┌─────────────────────────────────────────────┐
│ Generate record in block indicating         │  502
│ transmission of request for personal data   │
└─────────────────────────────────────────────┘
                      │
                      ▼
┌─────────────────────────────────────────────┐
│ Generate record in block indicating         │  504
│ transmission of request to obtain consent   │
│ from user                                   │
└─────────────────────────────────────────────┘
                      │
                      ▼
┌─────────────────────────────────────────────┐
│ Generate record in block indicating consent │  506
│ of user to transmission of personal data    │
└─────────────────────────────────────────────┘
                      │
                      ▼
┌─────────────────────────────────────────────┐
│ Generate record in block indicating         │  508
│ transmission of personal user data to       │
│ trusted party                               │
└─────────────────────────────────────────────┘
                      │
                      ▼
┌─────────────────────────────────────────────┐
│ Generate record in block indicating         │  510
│ readiness to send personal user data to     │
│ third party                                 │
└─────────────────────────────────────────────┘
```

Fig. 5

SYSTEMS AND METHODS FOR SENDING USER DATA FROM A TRUSTED PARTY TO A THIRD PARTY USING A DISTRIBUTED REGISTRY

CROSS-REFERENCE TO RELATED APPLICATION

This application claims benefit of priority under 35 U.S.C. 119(a)-(d) to a Russian Application No. 2019122429 filed on Jul. 17, 2019, which is incorporated by reference herein.

FIELD OF TECHNOLOGY

The present disclosure relates to the field of data security, and more specifically, to sending user data between parties which make it possible to ascertain the details of an interaction between the parties during the sending of that data.

BACKGROUND

The constant development and expansion of computer networks has led to the widespread use of related technologies for the gathering, sending, storage, analysis and use of various information in electronic formats, including personal user data. This, in turn, allows various persons to obtain access to a large volume of information, including the personal data of users. At the same time, situations arise where users are not able to manage or control the processing of their personal data by third parties. As a result, there is a need to protect personal user data, for example, to ensure the security, anonymity and confidentiality of personal user data, which has led to the appearance of legislative initiatives of various countries for its protection. For example, in the Russian Federation (RF), it is Federal Act F-152 "on personal data," and in the European Union, it is the General Data Protection Regulation (GDPR). Therefore, one technical goal is to create such solutions for the interaction of various parties such that the parties do not violate the requirements of the data processing rules of data processing set forth in the legislative initiatives taken by various countries. In this case, parties refers at least to devices such as a computer, a server, and a mobile device. Said devices may belong to either physical individuals (users) or various corporate persons (companies and enterprises).

At the same time, there is a need to obtain and process various kinds of personal user data. The data may be obtained from the user himself or herself, as well as from other parties which are already processing, e.g. storing, the data of the corresponding user. In both cases, according to the present rules of data processing, it is necessary to observe the requirements on the rights of users to control their personal data. Therefore, it is necessary for the user to give their consent to the processing and sending of data desired by another party. Such consent, and also the details of data transmittal, is advisably registered and saved in a database in order to resolve various possible conflict situations which may arise in future. One example might be a situation where the first party has sent user data to a second party, yet the user was not informed about this sending and did not give consent to it; in this case, the user may lodge a claim against the parties.

One variant solution of these problems is a solution utilizing the technology of distributed registers (e.g., blockchain technology). The decentralized scheme used in blockchain technology allows for transferring the authority and trust of a decentralized network and allows the nodes of the network to continuously and sequentially record transactions in public blocks, while creating a unique block chain. Thus, blockchain technology is able to organize an invariable incremental public database, independent of any one party, which can store information of various kinds.

At the same time, the specifics of blockchain technology generally does not support anonymity, and also does not allow a removal of records from the blocks contained in the chain of blocks. Therefore, this characteristic is a shortcoming for cases of exchanging personal data between parties, since the users may need to cancel their consent to processing of personal data and to remove the data from the information systems of the corresponding parties. On the one hand, this shortcoming might be removed by hashing the data being recorded in the block. But, on the other hand, this does not always make it possible to conceal the data, since methods exist for the restoring of data from its hashes, such as the sorting method. If a hash has been formed from structured data, such as personal data, it becomes possible to determine the data from which the hash was obtained in a reasonable time.

Thus, there is a need for a solution which is able to send data between parties with the consent of the owner (user) of the personal data, while being able to confirm the lawfulness of the sending and further processing of the data, in the event of a dispute arising between the parties and/or the owner of the data. It is also necessary for the solution to guarantee the reliability of the authentication of the parties during the sending of the data and to ensure the confidentiality of the personal data, for example, in the event of the user revoking his or her consent to the processing of the data.

SUMMARY

Aspects of the disclosure relate to the field of data security. In particular, aspects of the disclosure describe methods and systems for sending personal user data from a trusted party to a third party, while ensuring the confidentiality of the data and obtaining of the user's consent.

The present disclosure discusses the enablement of improved control over personal user data during its sending from a trusted party to a third party. This is accomplished by formation of a distributed registry in which each stage of the interaction of the parties is recorded, including that of the user, during the sending of user data. A third party device generates a request for the trusted party device to obtain user data and makes a record in a distributed registry, wherein the record includes the hash of the request data. The third party device sends the generated request and an identifier indicating the record in the distributed registry to the trusted party device. The trusted party device calculates the hash from the data of the request received and compares the calculated hash with the hash from the distributed registry according to the identifier received. In event of a match between the hashes, the trusted party device generates a request for confirmation of the data transmittal and makes a record in the distributed registry, wherein the record includes the hash of the data of that request. The trusted party device sends the said request for confirmation of the data transmittal and the identifier of the record in the distributed registry to the authorized user device. The trusted party device receives confirmation of the data sending, and the identifier indicating the record in the distributed registry, from the authorized user device. The trusted party device makes a verification of the confirmation received by calculating the hash of the received confirmation data and a further comparison with the hash from the distributed registry for the identifier received. In event of a match of the hashes, the trusted party device sends the requested data to the third party device.

In an exemplary aspect, a trusted party device may receive a request for user data and an identifier of a first record in a distributed registry, wherein the first record comprises a first hash of the request. In response to verifying that the first hash matches a hash of the request as calculated by the trusted party device, the trusted party device may generate both a confirmation request to send the user data and a second record in the distributed registry, wherein the second record comprises a second hash of the confirmation request. The trusted party device may transmit both the confirmation request and an identifier of the second record to an authorized user device. The trusted party device may receive, from the authorized user device, both a confirmation message and an identifier of a third record in the distributed registry, wherein the third record comprises a third hash of the confirmation message. In response to verifying that the third hash matches a hash of the confirmation message as calculated by the trusted party device, the trusted party device may send the requested user data.

In some aspects, the request for user data may be received from a third party device and the trusted part device may send the requested user data to the third party device.

In some aspects, the first hash may be calculated by the third party device, the second hash may be calculated by the trusted party device, and the third hash may be calculated by the authorized user device.

In some aspects, the request may be signed by an electronic digital signature of the third party device, the confirmation request may be signed by an electronic digital signature of the trusted party device, and the confirmation message may be signed by an electronic digital signature of the authorized user device.

In some aspects, each hash may be calculated based on aggregate data comprising both data in a received message and a respective electronic digital signature of a device from which the received message originates.

In some aspects, the trusted party device may further generate, by the trusted party device in the distributed registry, a fourth record comprising a fourth hash of the sent user data.

In some aspects, the third party device may be further configured to verify whether the fourth hash matches a hash of the user data as calculated by the third party device.

In some aspects, the authorized user device may be configured to (1) verify that the second hash matches a hash of the confirmation request as calculated by the authorized user device, (2) output an indication, for a user of the authorized user device, that the second hash matches the hash of the confirmation request, and (3) in response to receiving a user input from the user indicating approval to send the user data, generate both the confirmation message and the third record in the distributed registry.

In some aspects, the request for user data may comprise at least an identifier of a third party device, an identifier of the trusted party device, an identifier of a user with the authorized user device, and a desired type of user data.

In some aspects, the third party device may receive, from the authorized user device, the user's identifier with the trusted party device which is storing the user data.

In some aspects, the request for confirmation of the user data to the authorized user device may include at least the identifier of the third party device in the distributed registry, the identifier of the trusted party device in the distributed registry, the identifier of the user with the trusted party device, and data corresponding to the desired type of user data.

In some aspects, the requested data are sent in the form of a request created to confirm the sending of data, containing the desired user data.

In some aspects, the distributed registry is a database based on blockchain technology.

In some aspects, the user data is taken to mean at least personal data, private data, confidential data, and secret data.

In some aspects, a system and a non-transitory computer readable medium comprising instructions involving the authorized user device, the trusted party device, and the third party device, wherein those devices perform an exchange of information by communication channels for the sending of user data from the trusted party device to the third party device, according to the aforementioned aspects of the method.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

FIG. 5 illustrates a flow diagram of a method for registering the details of an interaction of the parties in the distributed registry based on blockchain technology during the sending of personal user data, in accordance with aspects of the present disclosure.

DETAILED DESCRIPTION

Figure 1:
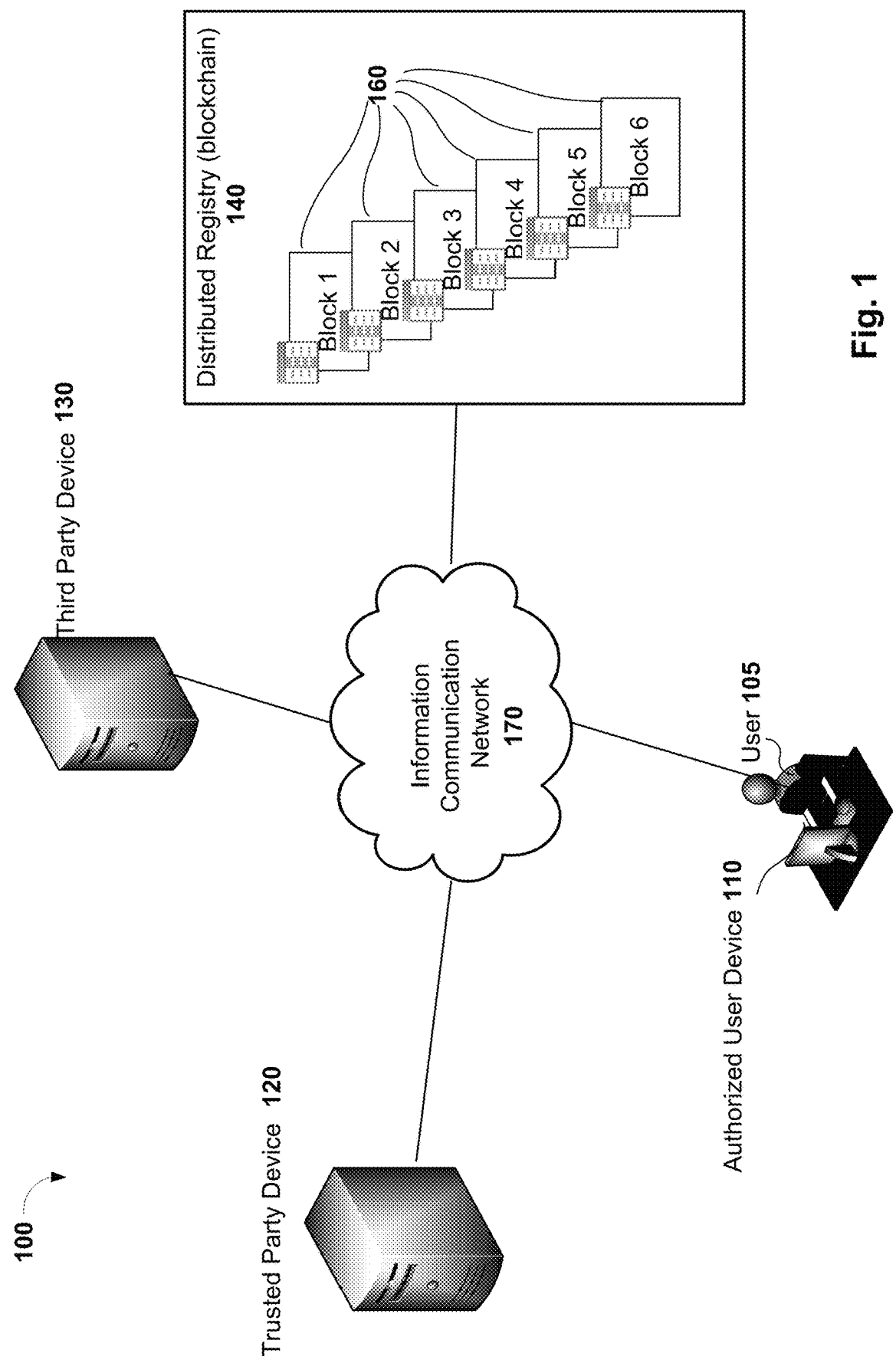
FIG. 1 shows a block diagram of a system for the sending of personal user data between devices in general form, in accordance with aspects of the present disclosure.

Exemplary aspects are described herein in the context of a system, method, and computer program product for sending requested data to a third party using a distributed registry. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

The following features will be used in describing the present disclosure:

Trusted party—a corporation or individual using a set of hardware and software (at least one computer device) on which data is stored, especially personal user data, and the user has previously given the right (consent) to process the stored data on those devices of the trusted party.

Third party—a corporation or individual using a set of hardware and software (at least one computer device) and needing to obtain user data for its processing.

Personal user data—any information directly or indirectly relating to a user and enabling an identification of the user. Personal data is divided into categories. Examples of personal data are: last name, first name, INI number, SNILS number, various kinds of files containing video and photo images, test data, including biometric personal data and data containing confidential information.

Depending on the embodiment of the disclosure, user data is also taken to mean, besides personal data, at least data such as private, confidential and secret data. In addition, user data can be understood as other data that may be requested, for example, corporate data, system and/or critical data.

The present disclosure makes it possible to improve the control over user data, especially personal data, during its sending to a third party, for example, from a trusted party. In a preferred variant embodiment, the control is achieved by generating records in a distributed registry as to the actions of the parties during their interaction when sending the user data to the third party, including the obtaining of consent/permission from the user via the authorized user device. Each record may be accompanied by an electronic digital signature of the corresponding party. In some aspects, by a distributed registry is meant a decentralized incremental database, which may be based on blockchain technology. A blockchain contains a continuous consecutive chain of blocks (a linked list), constructed according to certain rules, containing information, where all the records and blocks are interrelated with the aid of cryptography means. In this case, records of the actions of the parties are made in the blocks, where the records can be made either in one block or in various blocks of the blockchain.

FIG. 1 shows a block diagram of system 100 for the sending of personal user data between devices in general form, in accordance with aspects of the present disclosure.

The system 100 includes at least elements such as: the device 110 of a user 105, the device of a trusted party 120, the device of a third party 130 and a distributed registry 140. The system 100 is able to send user data which is stored on the device of the trusted party 120 to the device of the third party 130, while observing the confidentiality of the data and enabling a confirmation of the details of the interaction of the parties in the sending of that user data. Records on the details of the interaction are generated in the distributed registry 140. The interaction of the devices with each other and with the distributed registry 140 during which an exchange of information occurs is performed through various communication channels, such as an information communication network 170 like the Internet.

Figure 7:
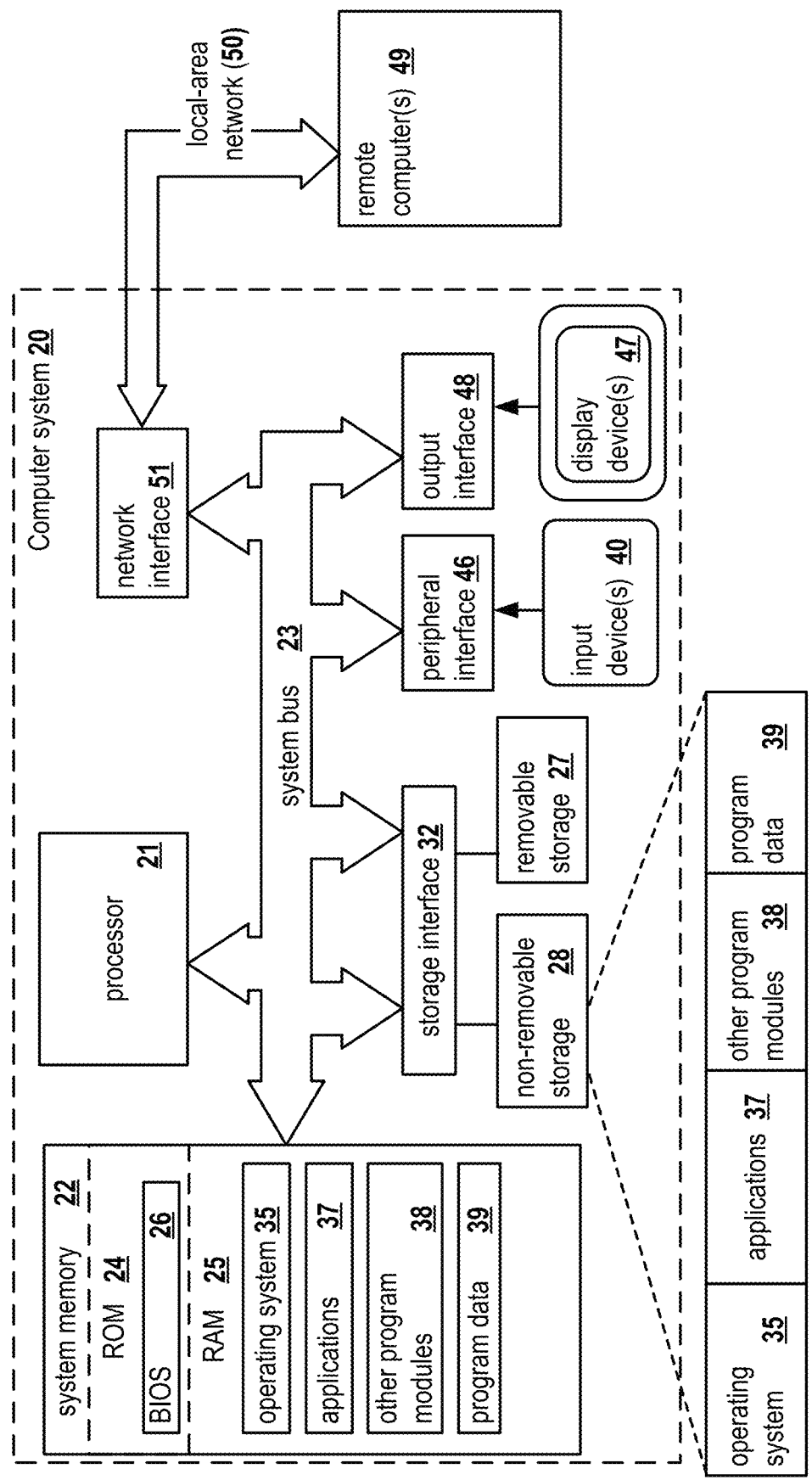
FIG. 7 presents an example of a general-purpose computer system on which aspects of the present disclosure can be implemented.

By each of the devices 110, 120 and 130 is meant one of the embodiments of computer system shown in FIG. 7. For example, the device 110 of the user 105 may be a mobile device, containing the necessary application for interaction with the devices 120 and 130, and also with the distributed registry 140. In turn, the device of the trusted party 120 may be a server, and the device of the third party 130 may be another server, such as a cloud server, each device containing an application (program) enabling an interaction with other devices and with the distributed registry 140. In an exemplary aspect, the distributed registry 140 is based on blockchain technology and consequently contains a chain of blocks made up of the blocks 160. In the blocks 160, for each sending of data, especially personal data, of the user, there is created a series of records describing the stages of the interaction of the parties participating in that data sending. An example of the aggregate of records created as a result of a sending of user data, for example in one block 160, is presented in FIG. 3. Each record in the block appears on the basis of the actions of the corresponding party and may contain various information. It should be noted that, if the distributed registry is not realized on the basis of blockchain technology, the block 160 is taken in the description to mean a division or section of the distributed registry where the records are made, depending on the embodiment of the distributed registry.

The device 110 is the device of a user 105, through which the interaction with the user occurs. Moreover, the device 110 itself or the application responsible for the interaction with other devices and with the distributed registry 140 may be set up such that it will make decisions on consent to a data sending without the participation of the user on the basis of rules previously established by the user. In this case, the setup is taken to mean a set of rules and conditions on the basis of which a particular decision will be made.

It should be noted that each device may use a particular digital signature, which is used to sign the data being recorded in the distributed registry 140 and desired to carry out the interaction between the parties in the sending of the user data. In some aspects, the digital signature technology is realized on a public key and private key bundle. In this case, each device contains a private (secret) key of the digital signature (DS) of the corresponding party and public keys of DS of other parties participating in the interaction. Thus, the device 110 will contain a private key of the DS of the user 105, while the devices 120 and 130 will contain the private keys of the DS of the trusted party and the third party, respectively.

Figure 2:
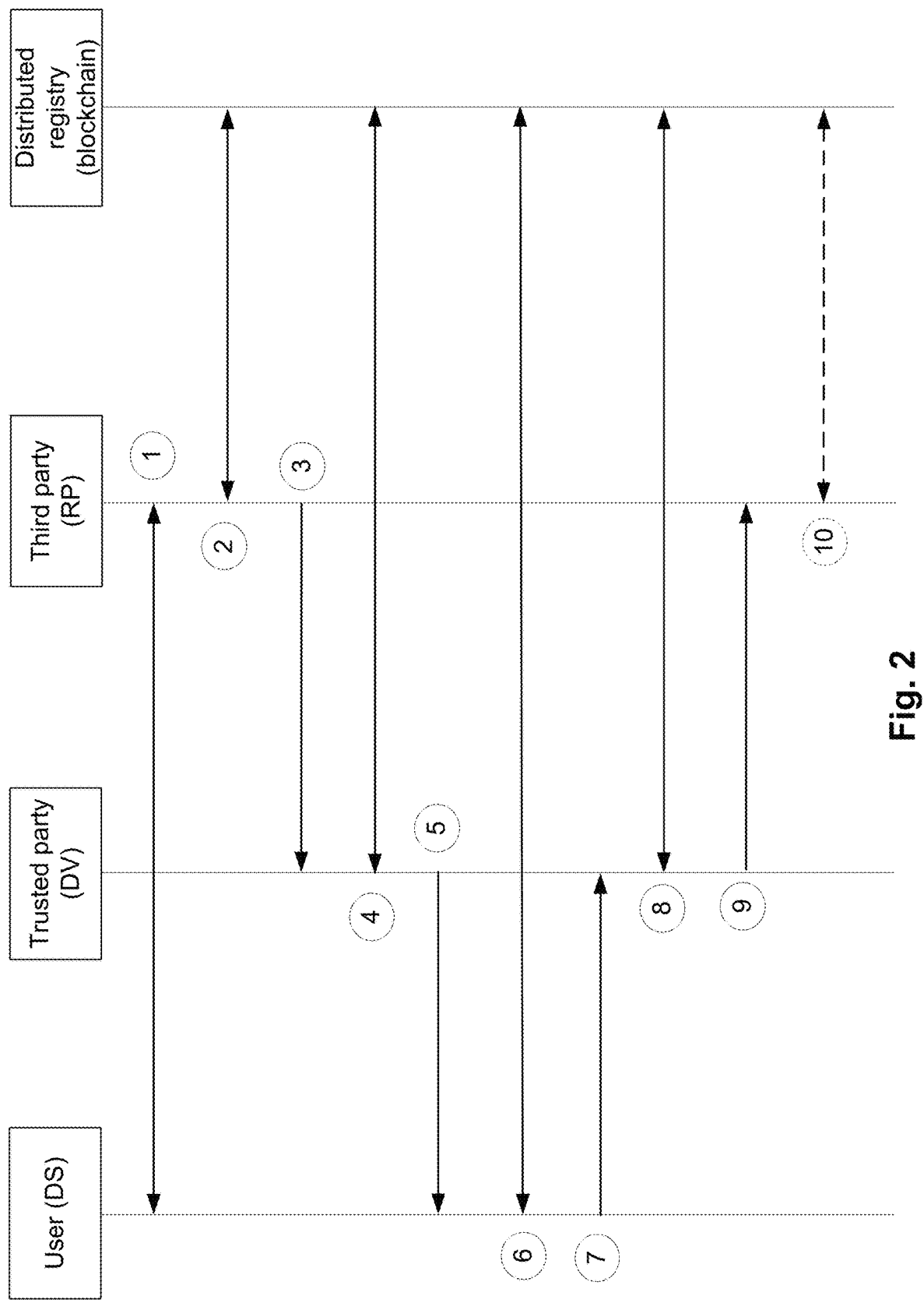
FIG. 2 shows a block diagram of an example of the interaction of the elements of the claimed system during a sending of personal user data, in accordance with aspects of the present disclosure.

FIG. 2 shows a block diagram of an example of the interaction of the elements of the claimed system during a sending of personal user data, in accordance with aspects of the present disclosure.

In the given variant embodiment of the proposed disclosure, the device of the trusted party 120 stores the data of a user 105, especially personal data, previously obtained from the device 110. The device of the trusted party 120 generates a unique identifier for the user and his or her data, especially personal data, which will be used to identify the corresponding user and his or her data on the device of the trusted party 120. The device 120 sends the generated unique identifier to the device 110 of the user 105.

The presented example of the interaction of the elements of the claimed system contains the following steps.

In the first step, the third party uses the device 130 to send a request to the device 110, where the request contains information on the desired data of the user 105. In response, the device 110 of the user 105 sends, and the device of the third party 130 receives, the identifier identifying the user 105 and his or her data on the device of the trusted party 120.

In a number of embodiments, situations are possible in which the device of the third party 130 already knows the identifier of the user on the device of the trusted party 120, and it may also be known which user data is stored on the device 120. In these instances, the first step may be skipped.

In the second step, on the device of the third party 130 generates a request to send data (hereinafter, the request), where the request contains at least the identifier of the third party in the distributed registry 140, the identifier of the trusted party in the distributed registry, the identifier of the user on the device of the trusted party, and the required type of data, especially personal data. In some aspects, these identifiers of the parties in the distributed registry 140 are obtained by the parties during the initial registration in the distributed registry 140. It is assumed in the context of the description of the present disclosure that the parties already possess those identifiers. After generating the request, the device 130 signs this request with the private key of the DS of the third party to form the electronic digital signature of the third party. Moreover, the device 130 makes a record containing information about the request to send data in the block 160 of the distributed registry 140. When the distributed registry 140 is realized by means of blockchain technology, the record will be made in the last block 160 in the chain of blocks. In some aspects, that record in the distributed registry 140 contains the hash which the device 130 calculates from the aggregate of data of that request and the DS of the third party. In this case, the hash is calculated from two types of data. The first type of data is structured data, such as personal data. The second type of data is random data, by which is meant in the present disclosure the electronic digital signatures of the parties, and, since the electronic digital signature will be individual for each instance of calculating the hash, one may speak of a randomness of the data. Consequently, by calculating the hash of the aggregate of structured data and random data, the problem of protection against selecting by the method of hash data selection is solved. The embodiment of the present disclosure by using DS as random data when calculating the hash is the preferred embodiment, since the task of selecting through original random data is exceedingly resource-hungry in this case.

In the third step, the device of the third party 130 sends to the device of the trusted party 120 the generated request, signed with the DS of the third party, and the identifier (a unique number) of the corresponding block 160 in the distributed registry 140.

In the fourth step, the device of the trusted party 120 calculates the hash of the aggregate of data received from the device of the third party 130. In one variant, the hash is calculated from the aggregate of data of the request to send personal data and the DS of the third party with which the received request is signed. The device of the trusted party 120 compares the calculated hash with the hash contained in the record made in the distributed registry 140 with the help of the device 130. The desired block 160 is revealed on the basis of the obtained identifier. Depending on the result of the comparison, the device of the trusted party 120 makes a further decision. In the case where the hashes do not match, the device 120 declines the request, terminates the interaction and notifies the device 130 of this. Otherwise, if the hashes match, the device of the trusted party 120 identifies the data desired by the third party according to the request and generates a request for confirmation of the sending of that data (hereafter, the request for confirmation), especially personal data. The request for confirmation contains at least the identifier of the third party in the distributed registry 140, the identifier of the trusted party in the distributed registry 140, the identifier of the user 105 on the device of the trusted party 120 and information about the data desired by the third party. The information about the data may contain either only the type of desired data or the desired data itself. The device 120 signs the generated request with the private key of the digital signature (DS) of the trusted party. After generating the request for confirmation, the device 120 makes a record in the distributed registry 140, containing an address indicating the storage location of the required data on the device of the trusted party 120 according to the request from the device of the third party 130. In one particular embodiment, the address indicates the actual generated request for confirmation which is stored on the device of the trusted party 120, for example when the request for confirmation also contains the actual required data. In a particular instance, this record is signed with the DS of the trusted party.

In yet another particular embodiment, in the fourth step the device 120 instead of the record of the aforementioned address in the distributed registry 140 makes a record containing information about the actual generated request for confirmation. As mentioned previously, in some aspects the record contains the hash of the aggregate of data of the request for confirmation and the DS of the trusted party used to sign the request for confirmation.

In the fifth step, the trusted party uses the device 120 to send to the device 110 of the user 105 the generated request signed with the DS of the trusted party and/or the identifier indicating the record made in the distributed registry 140.

In the sixth step, the user 105 uses the device 110 to perform a verification of the received request for confirmation, the verification including a determination of the correspondence of the type of data provided by the trusted party and the data requested by the third party, and also a verification of the data sent directly. The device 110 performs the verification of the correspondence between the type of data requested by the third party and the data provided by the trusted party by comparing the data in the request for confirmation and the request from the third party. In the case of using hashes for storage in the distributed registry 140, the device 110 first calculates the corresponding hashes from the requests. Using the obtained identifier, the device 110 accesses the distributed registry 140. If the data being sent is correct and the user 105 consents, the device 110 makes a record in the distributed registry 140, where the record corresponds to the request for confirmation received from the device of the trusted party 120, signed by the DS of the trusted party. In some aspects, the record contains the hash of the aggregate of data of the request for confirmation and the DS of the trusted party, the device 110 first calculating that hash.

Next, the device 110 generates a permission to send the data (hereinafter, the permission), where said permission includes at least the identifier of the third party in the distributed registry, the identifier of the trusted party in the distributed registry, the identifier of the user on the device of the trusted party, and the data desired by the third party. The device 110 signs the generated permission with the digital signature of the user 105. After generating the permission, the device 110 makes a record in the block 160 of the distributed registry 140. The record includes the hash generated from the aggregate of the data of the permission and the DS of the user 105 with which the permission is signed.

In the seventh step, the device 110 sends the generated permission, signed by the DS of the user 105, to the device of the trusted party 120.

In the eighth step, the device of the trusted party 120 makes a verification of the data received and the data contained in the distributed registry 140. The verification consists in the device 120 calculating the hash of the aggregate of data of the received permission and the DS of the user 105 by which the received permission is signed. Next, the calculated hash is compared with the hash corresponding to the record previously made by the device 110 in the block 160. If the hashes match, the device 120 makes a record in the distributed registry 140, containing information about the readiness of the device of the trusted party 120 to send data to the device of the third party 130. In some aspects, the record is generated in the form of a flag.

In the ninth step, the device of the trusted party 120, after generating the record of readiness to send data, carries out the sending of the data corresponding to the request of the device of the third party 130. In some aspects, the sending of the data is performed by sending the request for confirmation that was previously created by the device of the trusted party 120, if the request for confirmation also contained the actual data being requested.

In addition, the device of the third party 130, in the tenth step, after obtaining the data, may perform a verification of the correspondence between the data received and the presence of the permission of the user 105 for the sending of the data received. The verification is performed with the aid of the records contained in the block 160 of the distributed registry 140 according to the corresponding identifier. Thus, the device 130 calculates the hash of the data received and the DS used to sign the data, and makes a verification with the records from the distributed registry, where the records contain hashes. The verification is performed with the records which were generated by the authorized user device 110. If the hashes match, the device of the third party proceeds with the processing of the obtained data.

It should be noted that, in a number of embodiments, during each step, the corresponding device among the aforementioned devices also makes a verification of the actual DS used to sign the data received.

Figure 3:
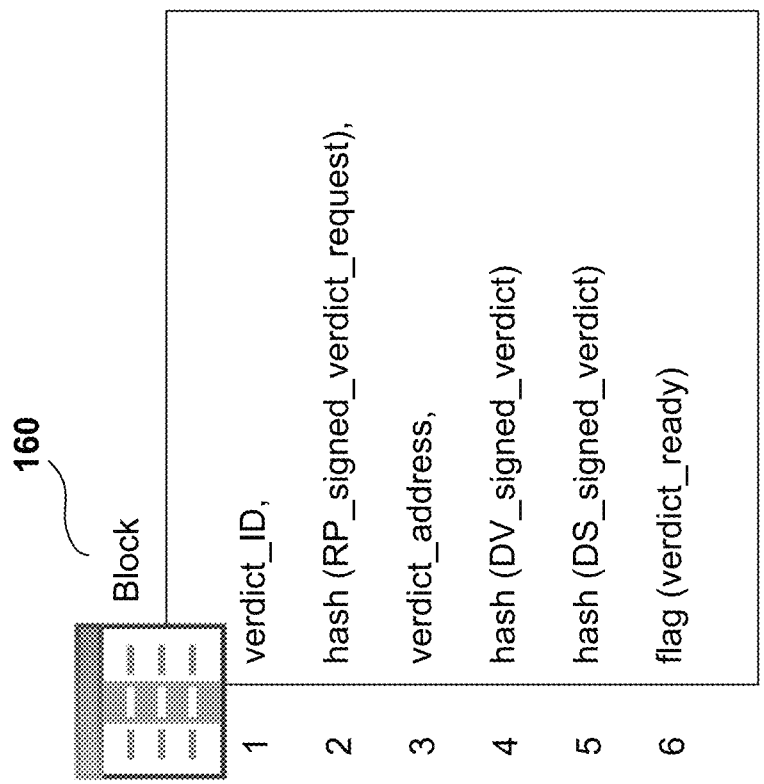
FIG. 3 shows a block diagram of an example record in the distributed registry, arranged in a particular form, as a result of the sending of user data, in accordance with aspects of the present disclosure.

FIG. 3 shows a block diagram of an example record in the distributed registry, arranged in a particular form, as a result of the sending of user data, in accordance with aspects of the present disclosure. For convenience, all the records are made in the same block 160 of the distributed registry 140, but the embodiment of the present disclosure is not limited by this.

Thus, the first line contains the record containing information about the unique identifier of the transaction. The second line contains a record containing the hash calculated from the aggregate of data of the request to send data and the digital signature of the third party. The third line contains a record containing information about the identifier indicating the location of the data on the device of the trusted party. The fourth line contains a record containing the hash calculated from the aggregate of data of the request for confirmation of the data sending and the digital signature of the trusted party. The fifth line contains a record containing the hash calculated from the aggregate of data of the permission for the data sending and the electronic digital signature of the user. The sixth line contains a record in the form of a flag containing information about the readiness of the device of the trusted party to send data to the device of the third party.

Figure 4:
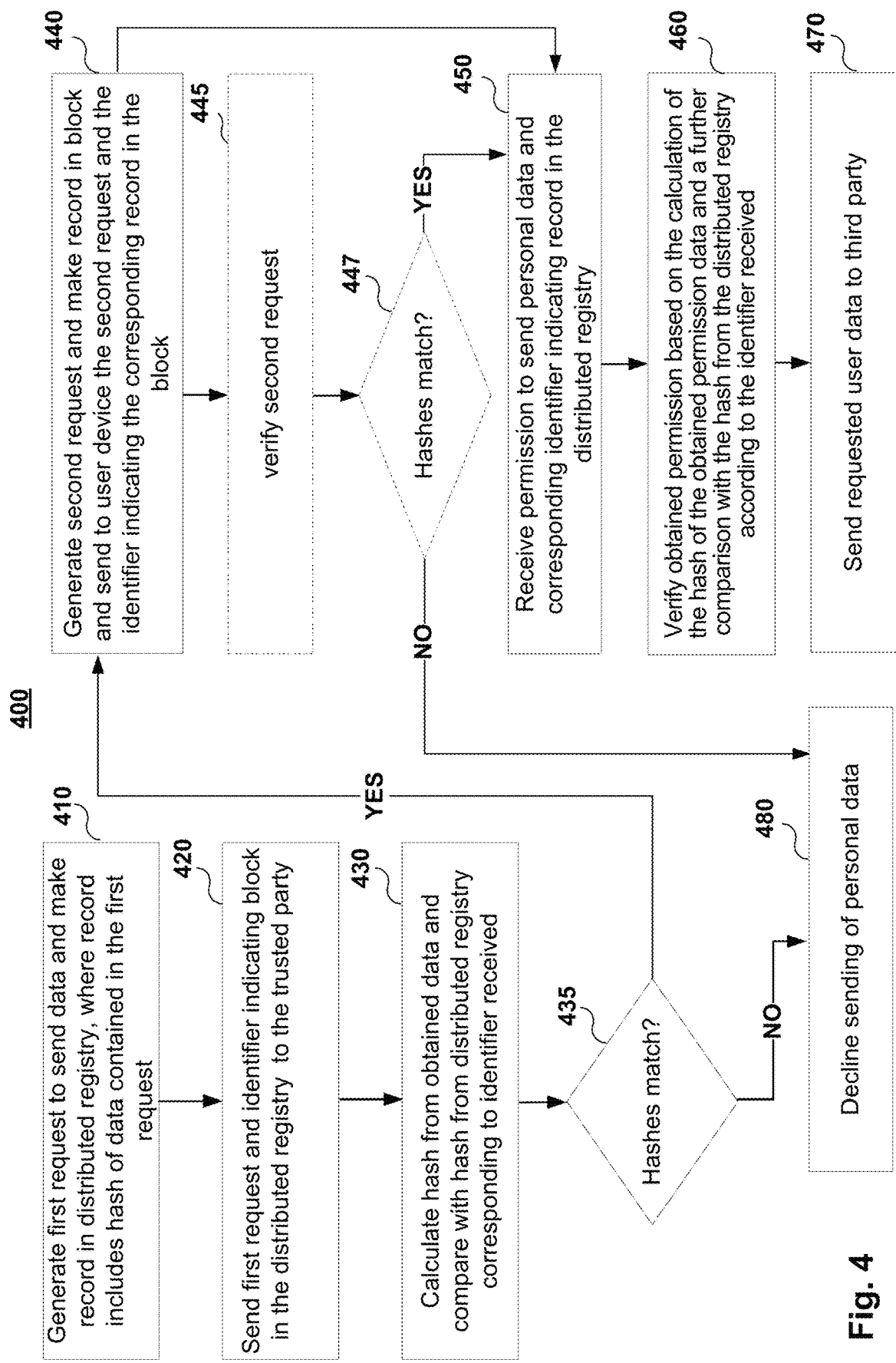
FIG. 4 shows a flow diagram of a method for sending personal user data from a trusted party device to a third party device, in accordance with aspects of the present disclosure.

FIG. 4 shows a flow diagram of method 400 for sending personal user data from a trusted party to a third party, in accordance with aspects of the present disclosure. The method is realized with the aid of the devices of the system 100. Thus, the device 120 corresponds to the trusted party and the device 130 to the third party. Method 400 comprises the sending of personal user data from a trusted party to a third party for its subsequent processing, registering each detail of the interaction between the parties in a distributed registry 140. In this case, the personal user data is stored with the trusted party, while the device 110 of the user 105 contains information about the location of his or her personal data on the device of the trusted party 120, for example, it contains an identifier for identifying the personal data of the corresponding user stored with the trusted party.

At 410, the device of the third party generates a request for personal user data (first request) to be received by the device of the trusted party and a record is made in the block 160 of the distributed registry 140, wherein the record includes the hash of the data contained in the first request. In a particular variant embodiment, the first request is likewise signed with the digital signature of the third party, where the first request includes at least the identifier of the third party in the distributed registry, the identifier of the trusted party in the distributed registry, the identifier of the user with the trusted party and the type of personal user data desired by the third party. In this case, the hash is calculated from the aggregate of data of the first request and the electronic digital signature of the third party.

At 420, the device of the third party sends the first request and the identifier indicating the block in the distributed registry to the device of the trusted party.

At 430, the device of the trusted party calculates the hash of the data of the first request and at 435, the calculated hash is compared, by the device of the trusted party, with the hash from the block in the distributed registry, identified according to the received identifier.

At 440, if the hashes match, the device of the trusted party generates a request for confirmation of the sending of personal data (second request) to the authorized user device. The device of the trusted party makes a record in the block of the distributed registry, where the record includes a second hash of the data of the second request. The device of the trusted party may send the second request and the identifier of the record in the block of the distributed registry to the authorized user device.

It should be noted that in yet another variant embodiment the second request is signed with the digital signature of the trusted party and the second request includes at least the identifier of the third party in the distributed registry, the identifier of the trusted party in the distributed registry, the identifier of the user with the trusted party and the personal data corresponding to the type of personal user data desired. Moreover, the second hash is calculated from the aggregate of data from the second request and the digital signature of the trusted party.

If at 435 the compared hashes do not match, method 400 proceeds to 480, where the process of data sending is concluded. In yet another particular embodiment, if the hashes do not match, an additional request is made from the trusted party to the third party by the computer devices in order to refine the obtained first request (step not shown in FIG. 4).

At 450, the device of the trusted party is used to obtain permission to send the personal data and the identifier indicating the record in the block of the distributed registry from the authorized user device. In some aspects, the obtained permission to send the personal data is signed with the digital signature of the user, while the record in the block contains the hash of the aggregate of data of that permission and the DS of the user.

It should be noted that, in a particular embodiment, between 440 and 450 for example, in additional steps 445 and 447, the authorized user device may:

a. obtain a second request from the device of the trusted party and the identifier of the record in the block of the distributed registry, b. calculate the hash of the second request and compare the hash with the hash from the block in the distributed registry according to the identifier received from the device of the trusted party, c. notify the user of the received request and the results of the comparison of the hashes, d. receive a response (consent) from the user which is used to create a record in a block of the distributed registry in the form of a hash, the hash being calculated from the response of the user and the electronic digital signature of the user, e. send a response to the device of the trusted party, where the response contains the permission to send the personal data and the identifier indicating the record in the block of the distributed registry.

In yet another particular instance, if during the comparison the hash and the hash from the block match, the authorized user device automatically produces a response containing permission to send said personal data.

At 460, the device of the trusted party is used to make a verification of the permission received from the authorized user device by calculating the hash of the permission data received and a further comparison with the hash found in the block of the distributed registry according to the identifier received.

At 470, if the hashes match, the device of the trusted party is used to send the requested personal user data to the device of the third party. In a particular embodiment, at 470, the requested personal user data is sent in the form of the previously created request for confirmation of the sending of the personal data.

In some aspects, the device of the trusted party may make a record in a block of the distributed registry on the sending of the personal user data to the device of the third party, where the record contains the hash of the aggregate of data sent. In an embodiment where the request is signed by a digital signature, the hash is calculated from the aggregate of data sent and the digital signature.

In another particular embodiment of the method, in addition the device of the third party is used to make a verification of the personal data received from the device of the trusted party by comparing the hashes and only in the event of a match is further processing of the personal data be done, wherein one hash is calculated on the basis of the data received from the device of the trusted party and the other hash is found in the transaction block of the distributed registry according to the identifier. It should be noted that, depending on the embodiment, a database based on blockchain technology may be used as the distributed registry.

FIG. 5 illustrates a flow diagram of method 500 for registering the details of an interaction of the parties in the distributed registry based on blockchain technology during the sending of personal user data, in accordance with aspects of the present disclosure.

Method 500 is realized with the aforementioned means of the system 100. During the sending of the personal data, a record is made in a distributed registry (the blockchain database) 140 of the details of obtaining consent for the sending and the details of the actual sending of the personal data of a user 105 from the device of the trusted party 120 to the device of a third party 130, where the device of the trusted party 120 is storing personal data previously received from the device 110 of the user 105. When sending any data, the devices of the parties in the interaction utilize digital signatures of the corresponding parties. Each record made in the blocks of the blockchain database 140 contains the hash of the aggregate of data and the digital signature of the party generating the record in the block 160.

At 502, a record is generated in a block 160, indicating the sending of a request for personal data from the device of a third party 130 to the device of a trusted party 120. The record contains information about each party, making it possible to identify each party, the user, and the requested types of personal data of the user 105. At 504, yet another record is generated in the block 160, indicating the sending from the device of the trusted party 120 of a request to the device 110 of the user 105 to obtain consent from the user 105 for the sending of personal data to the third party 130. The record may contain both information about each party allowing an identification of each party, the user, and the personal data requested, and an address indicating the requested data on the device of the trusted party 120.

At 506, another record is generated in the block 160, indicating the permission of the user 105 for the sending of the personal data. The record contains information about each party allowing an identification of each party, the user, and the consent of the user 105 to the sending of the personal data to the third party 130. At 508, yet another record is generated in the block 160, indicating the readiness to send and the sending of the personal data of the user 105 from the device of the trusted party 120 to the device of the third party 130. The record contains information about each party allowing an identification of each party, the user, and the requested personal data. In a particular embodiment, at 510, another record is generated in the block, indicating the obtaining of the personal data of the user 105 by the device of the third party 130 from the device of the trusted party 120. The record contains information about each party, allowing an identification each party, the user, and the requested personal data, or it is a marker indicating the successful obtaining of the personal data.

Figure 6:
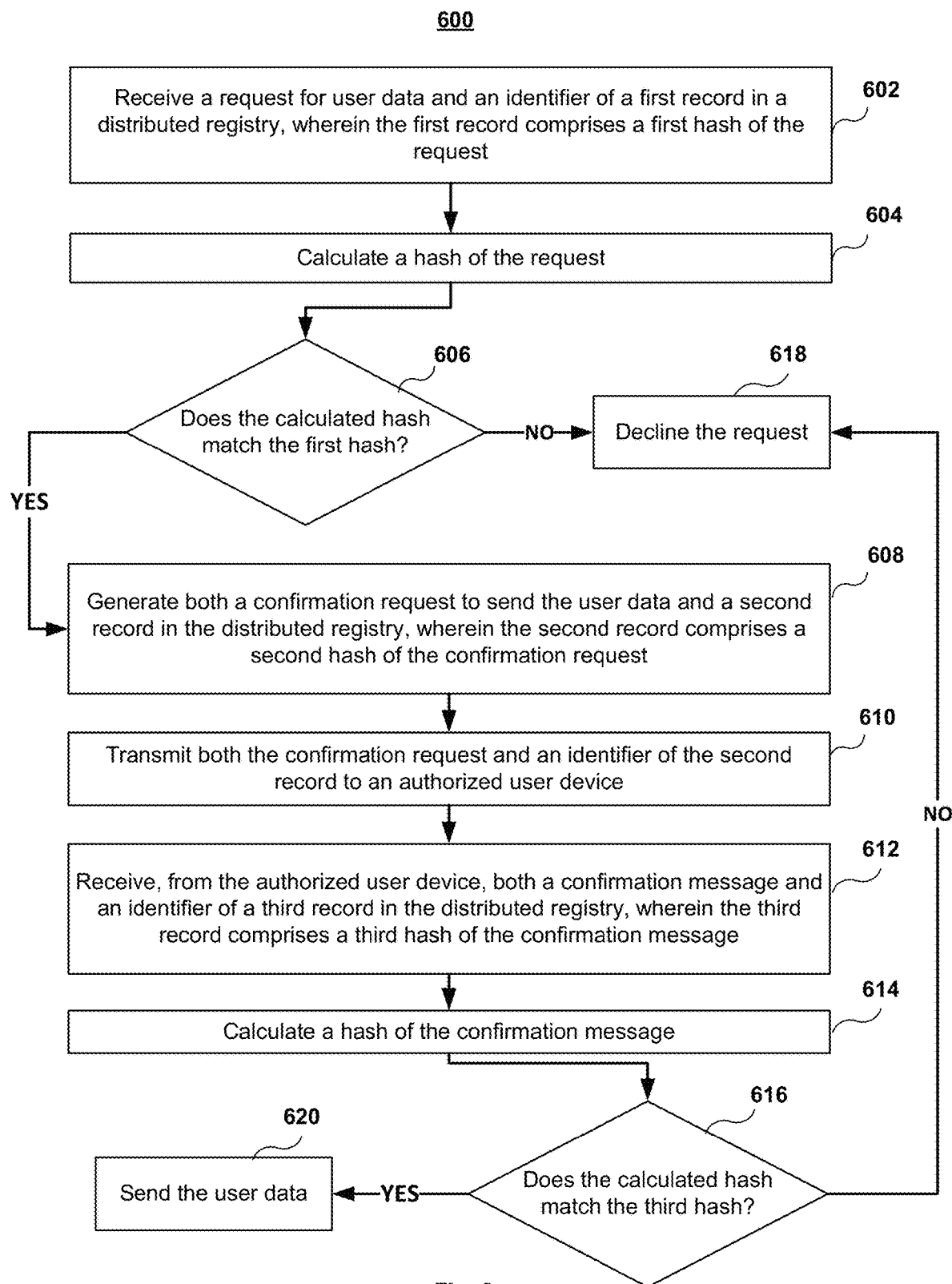
FIG. 6 illustrates a flow diagram of a method for securely sending requested user data, in accordance with aspects of the present disclosure.

FIG. 6 illustrates a flow diagram of method 600 for securely sending requested user data, in accordance with aspects of the present disclosure. Depending on the embodiments of the present disclosure, the indicated data can mean not only user data (as described in the description above), but also other types of data such as corporate data, system critical data, etc.

At 602, trusted party device 120 may receive (e.g., via information communication network 170) a request for user data and an identifier of a first record (e.g., in records 160) in distributed registry 140, wherein the first record comprises a first hash of the request. The request may originate from third party device 130.

At 604, trusted party device 120 may calculate a hash of the request to ensure that the hash in distributed registry 140 is valid and that the request from third party device 130 is not malicious.

At 606, trusted party device 120 may determine whether the first hash matches the hash of the request as calculated by trusted party device 120. In response to determining that the respective hashes match, method 600 proceeds to 608, where trusted party device 120 may generate both a confirmation request to send the user data and a second record in distributed registry 140, wherein the second record comprises a second hash of the confirmation request.

At 610, trusted party device 120 may transmit both the confirmation request and an identifier of the second record to authorized user device 110.

At 612, trusted party device 120 may receive, from authorized user device 110, both a permission to send the data (a confirmation message) and an identifier of a third record in distributed registry 140, wherein the third record comprises a third hash of the confirmation message.

At 614, trusted party device 120 may calculate a hash of the confirmation message to ensure that the confirmation message is from a legitimate source (the authorized user device 110).

At 616, trusted party device 120 determines whether the third hash matches the hash of the confirmation message as calculated by trusted party device 120. In response to determining that the respective hashes match, at 620, trusted party device 120 sends the user data to third party device 130 (e.g., via information communication network 170).

If at 606 or 620, trusted party device 120 determines that the hashes do not match, method 600 ends at 618, where trusted party device 120 declines/ignores the request. This is because the request and/or the confirmation message may be invalid.

It is worth noting that record identifiers, as mentioned earlier, indicate the unique number of block 160 in which the corresponding entry in distributed registry 140 is located. Thus, the path by which the corresponding entry in distributed registry 140 can be found is determined.

FIG. 7 is a block diagram illustrating a computer system 20 on which aspects of systems and methods for sending requested data to a third party using a distributed registry may be implemented in accordance with an exemplary aspect. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system. Accordingly, each module may be realized in a variety of suitable configurations, and should not be limited to any particular implementation exemplified herein.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for securely sending requested data, the method comprising:
    receiving, at a trusted party device, a request for data and an identifier of a first record in a distributed registry, wherein the first record comprises a first hash of the request;
    in response to verifying that the first hash matches a hash of the request as calculated by the trusted party device, generating, by the trusted party device, both a confirmation request to send the data and a second record in the distributed registry, wherein the second record comprises a second hash of the confirmation request;
    transmitting, by the trusted party device, both the confirmation request and an identifier of the second record to an authorized user device;
    receiving, at the trusted party device from the authorized user device, both a confirmation message and an identifier of a third record in the distributed registry, wherein the third record comprises a third hash of the confirmation message; and
    in response to verifying that the third hash matches a hash of the confirmation message as calculated by the trusted party device, sending the requested data.

2. The method of claim 1, wherein the data is at least one of user data, corporate data, system critical data.

3. The method of claim 1, wherein identifier records are a unique number of blocks that contain a corresponding record in the distributed register.

4. The method of claim 1, wherein the request for data is received from a third party device and the trusted part device sends the requested data to the third party device.

5. The method of claim 4, wherein the first hash is calculated by the third party device, the second hash is calculated by the trusted party device, and the third hash is calculated by the authorized user device.

6. The method of claim 4, wherein the request is signed by an electronic digital signature of the third party device, the confirmation request is signed by an electronic digital signature of the trusted party device, and the confirmation message is signed by an electronic digital signature of the authorized user device.

7. The method of claim 6, wherein each hash is calculated based on aggregate data comprising both data in a received message and a respective electronic digital signature of a device from which the received message originates.

8. The method of claim 4, wherein sending the data further comprises generating, by the trusted party device in the distributed registry, a fourth record comprising a fourth hash of the sent data.

9. The method of claim 8, wherein the third party device is further configured to verify whether the fourth hash matches a hash of the data as calculated by the third party device.

10. The method of claim 1, wherein the authorized user device is configured to:
verify that the second hash matches a hash of the confirmation request as calculated by the authorized user device;
output an indication, for a user of the authorized user device, that the second hash matches the hash of the confirmation request; and
in response to receiving a user input from the user indicating approval to send the data, generate both the confirmation message and the third record in the distributed registry.

11. The method of claim 1, wherein the request for data comprises at least an identifier of a third party device, an identifier of the trusted party device, an identifier of a user with the authorized user device, and a desired type of data.

12. A system for securely sending requested data, the system comprising a trusted party device with a hardware processor configured to:
receive a request for data and an identifier of a first record in a distributed registry, wherein the first record comprises a first hash of the request;
in response to verifying that the first hash matches a hash of the request as calculated by the trusted party device, generate both a confirmation request to send the data and a second record in the distributed registry, wherein the second record comprises a second hash of the confirmation request;
transmit both the confirmation request and an identifier of the second record to an authorized user device;
receive, from the authorized user device, both a confirmation message and an identifier of a third record in the distributed registry, wherein the third record comprises a third hash of the confirmation message; and
in response to verifying that the third hash matches a hash of the confirmation message as calculated by the trusted party device, send the requested data.

13. The system of claim 12, wherein the request for data is received from a third party device and the hardware processor of the trusted party device is further configured to send the requested data to the third party device.

14. The system of claim 13, wherein the first hash is calculated by a hardware processor of the third party device, the second hash is calculated by the hardware processor of the trusted party device, and the third hash is calculated by a hardware processor of the authorized user device.

15. The system of claim 13, wherein the request is signed by an electronic digital signature of the third party device, the confirmation request is signed by an electronic digital signature of the trusted party device, and the confirmation message is signed by an electronic digital signature of the authorized user device.

16. The system of claim 15, wherein each hash is calculated by a respective hardware processor based on aggregate data comprising both data in a received message and a respective electronic digital signature of a device from which the received message originates.

17. The system of claim 13, wherein the hardware processor is further configured to generate, in the distributed registry, a fourth record comprising a fourth hash of the sent data.

18. The system of claim 17, wherein a hardware processor of the third party device is configured to verify whether the fourth hash matches a hash of the data as calculated by the third party device.

19. The system of claim 12, wherein a hardware processor of the authorized user device is configured to:
verify that the second hash matches a hash of the confirmation request as calculated by the authorized user device;
output an indication, for a user of the authorized user device, that the second hash matches the hash of the confirmation request; and
in response to receiving a user input from the user indicating approval to send the data, generate both the confirmation message and the third record in the distributed registry.

20. A non-transitory computer readable medium storing thereon computer executable instructions for securely sending requested data, including instructions for:
receiving, at a trusted party device, a request for data and an identifier of a first record in a distributed registry, wherein the first record comprises a first hash of the request;
in response to verifying that the first hash matches a hash of the request as calculated by the trusted party device, generating, by the trusted party device, both a confirmation request to send the data and a second record in the distributed registry, wherein the second record comprises a second hash of the confirmation request;
transmitting, by the trusted party device, both the confirmation request and an identifier of the second record to an authorized user device;
receiving, at the trusted party device from the authorized user device, both a confirmation message and an identifier of a third record in the distributed registry, wherein the third record comprises a third hash of the confirmation message; and
in response to verifying that the third hash matches a hash of the confirmation message as calculated by the trusted party device, sending the requested data.

\* \* \* \* \*